US009746258B2

(12) United States Patent
O'Keefe (10) Patent No.: US 9,746,258 B2
(45) Date of Patent: Aug. 29, 2017

(54) CONTAMINATION BARRIER FOR HEAT EXCHANGERS

(71) Applicant: Thomas John O'Keefe, Chesterton, IN (US)

(72) Inventor: Thomas John O'Keefe, Chesterton, IN (US)

(*) Notice: Subject to any disclaimer, the term of this patent is extended or adjusted under 35 U.S.C. 154(b) by 591 days.

(21) Appl. No.: 14/053,908

(22) Filed: Oct. 15, 2013

(65) Prior Publication Data

US 2014/0102677 A1    Apr. 17, 2014

Related U.S. Application Data

(60) Provisional application No. 61/713,781, filed on Oct. 15, 2012.

(51) Int. Cl.
| | | |
|---|---|---|
| *F28F 19/00* | (2006.01) | |
| *F28F 19/01* | (2006.01) | |
| *F25B 47/00* | (2006.01) | |
| *B01D 46/10* | (2006.01) | |

(52) U.S. Cl.
CPC ............ *F28F 19/002* (2013.01); *F25B 47/00* (2013.01); *F28F 19/01* (2013.01); *B01D 46/10* (2013.01)

(58) Field of Classification Search
CPC ......... F28F 19/002; F28F 19/01; F25B 47/00; B01D 46/10
USPC .............................................. 165/134.1, 119
See application file for complete search history.

(56) References Cited

U.S. PATENT DOCUMENTS

| | | | | |
|---|---|---|---|---|
| 4,035,164 A | * | 7/1977 | Taylor ........................ | B03C 3/28 131/333 |
| 4,878,536 A | * | 11/1989 | Stenlund ................ | B01D 35/18 123/196 AB |
| 5,042,575 A | * | 8/1991 | Lindsay ............... | B60H 1/3227 165/133 |
| 5,131,463 A | * | 7/1992 | Zimmerli ................ | F28F 19/01 165/119 |
| 5,476,139 A | * | 12/1995 | Gire ...................... | B01D 29/114 165/119 |
| 5,809,800 A | * | 9/1998 | Deal ......................... | F24F 1/58 55/500 |
| 5,993,501 A | * | 11/1999 | Cusick .................. | B01D 39/202 210/506 |
| 6,315,806 B1 | * | 11/2001 | Torobin ............. | B01D 39/1623 264/112 |

(Continued)

Primary Examiner — Jianying A Tkisson
Assistant Examiner — Raheena R Malik
(74) Attorney, Agent, or Firm — Hartman Global IP Law; Gary M. Hartman; Domenica N. S. Hartman (57) ABSTRACT

A contamination barrier for protecting heat exchanger units, for example, condensers of heating, ventilation, and air conditioning (HVAC) systems. The contamination barrier includes a filtration media which allows particles small enough to pass through a condenser assembly to pass through the contamination barrier, while preventing larger particles from passing therethrough. The contamination barrier inhibits the buildup of debris and other contamination within the condenser assembly while reducing or eliminating the need to clean the barrier, and without significantly reducing airflow through the condenser assembly, thereby promoting the ability of the condenser assembly to maintain operational efficiency. The contamination barrier is adaptable to be applied to a variety of heat exchanger units.

21 Claims, 5 Drawing Sheets

(56) References Cited

U.S. PATENT DOCUMENTS

| | | | | |
|---|---|---|---|---|
| 6,418,974 B1* | 7/2002 | King | .................. | B01D 46/0001 139/383 R |
| 6,793,715 B1* | 9/2004 | Sandberg | ............... | B01D 46/10 55/486 |
| 6,810,950 B1* | 11/2004 | Manze, III | .............. | F28F 9/002 165/119 |
| 7,323,028 B2* | 1/2008 | Simmons | ........... | B01D 46/0005 55/351 |
| 7,332,011 B1* | 2/2008 | Sandberg | ........... | B01D 46/0005 55/491 |
| 7,387,645 B2* | 6/2008 | Fernandes | ................ | A61F 2/07 424/93.2 |
| 7,591,870 B2* | 9/2009 | Simmons | ............... | B01D 46/10 55/385.1 |
| 7,805,953 B2* | 10/2010 | Jensen | .................... | F24F 1/027 62/305 |
| 2005/0279064 A1* | 12/2005 | Simmons | ........... | B01D 46/0005 55/495 |
| 2008/0289794 A1* | 11/2008 | Leitch | .................... | B60K 11/04 165/41 |
| 2009/0223652 A1* | 9/2009 | Lee | .................... | H05K 7/20181 165/104.31 |
| 2011/0284185 A1* | 11/2011 | Cullen | ................ | F24F 1/0029 165/104.11 |
| 2012/0103482 A1* | 5/2012 | Simmons | ................ | F28B 9/005 150/165 |

* cited by examiner

CONTAMINATION BARRIER FOR HEAT EXCHANGERS

CROSS REFERENCE TO RELATED APPLICATIONS

This application claims the benefit of U.S. Provisional Application Ser. No. 61/713,781, filed Oct. 15, 2012, the contents of which are incorporated herein by reference.

BACKGROUND OF THE INVENTION

This invention relates to methods and apparatuses suitable for maintaining the cleanliness of heat exchangers, a non-limiting example being condenser units of heating, ventilation, and air conditioning (HVAC) systems.

Condensers are a type of heat exchanger primarily used to transfer heat between two mediums, for example, air and a refrigerant, in various heat transfer systems, including but not limited to space heaters, air conditioners, and automotive radiators. In typical HVAC systems, a compressed refrigerant vapor enters a condenser that serves to condense the refrigerant to its liquid state. In particular, the refrigerant vapor flows through hollow cooling coils or tubes of the condenser, where heat is released from the refrigerant and transferred to the surrounding atmosphere, for example, air drawn through fins in contact with the tubes. Thereafter, the condensed refrigerant, which is cooler but still under pressure, is forced through an expansion valve to form a mist before entering an evaporator where the refrigerant is evaporated to its vapor state before again being compressed. The evaporator draws heat from the surrounding atmosphere, which is thereby cooled. In an HVAC system, the cooled air can be circulated through a room, building, passenger compartment, etc.

Figure 1:
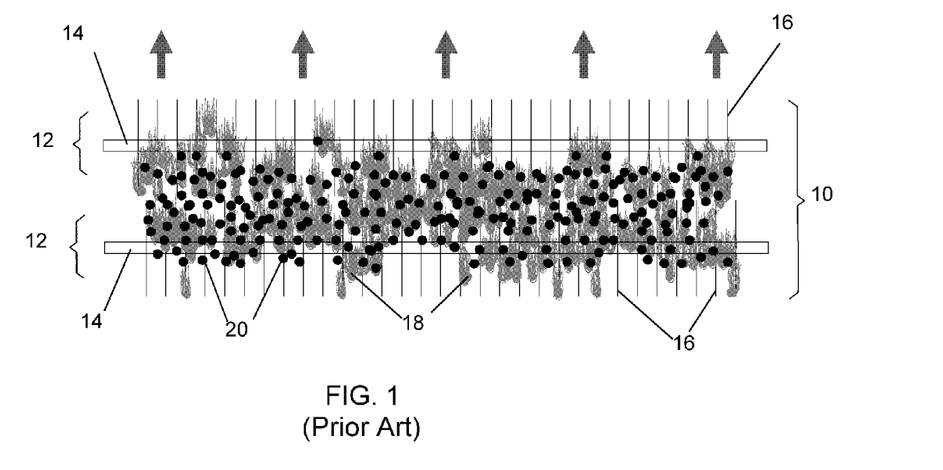
FIG. 1 schematically represents relatively coarse and fine contaminants trapped within and between two sets of tube and fin assemblies of a condenser assembly of a type used in commercial HVAC systems.
Figure 2:
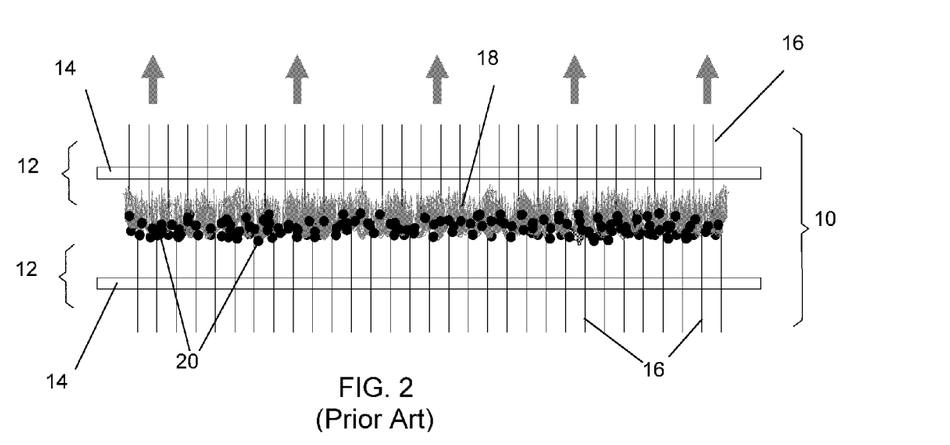
FIG. 2 schematically represents the appearance of the condenser assembly of FIG. 1 after removal of the contaminants from an outermost set of the tube and fin assemblies and subsequent entrapment of additional coarse and fine contaminants between the two sets of tube and fin assemblies.

Condensers for commercial HVAC systems installed in buildings are often located on the roofs of the buildings. As a result, the heat transfer efficiency of a condenser, and therefore the efficiency of the entire HVAC system, declines over time due to debris and outdoor contaminants becoming entrapped within the condenser's tubes. Such a scenario is depicted in FIG. 1, which represents a condenser assembly 10 comprising at least two sets of tube and fin assemblies 12, each having at least one tube 14 (optionally configured as a coil) contacted by multiple fins 16. Contaminants are represented as including relatively coarse debris 18 and relatively finer particulate debris 20. The condenser assembly 10 can be manually cleaned, though doing so can be difficult, time-consuming, and possibly result in damage to the condenser assembly 10. In addition, and as represented in FIG. 2, it can be difficult to remove the debris 18 and 20 from between the tube and fin assemblies 12. Coarse debris 18 can be particularly difficult to remove, with the result that the remaining coarse debris 18 entraps both coarse and particulate debris 18 and 20 during subsequent operation of the condenser assembly 10.

Another approach involves protecting the condenser assembly 10 with a filter that serves to filter the air being drawn through the condenser assembly 10. Commercial examples of such filters are often constructed of a plastic or rubber-coated nylon or some form of loosely woven plastic fibers, configured as a single-layer or multiple-layer mat that is often very thin, for example, less than one centimeter. Filters of this type can be designed to be cleaned periodically or as needed, though at least annually, and are designed for a service life of roughly ten years. These filter products are typically designed and sized for use with a specific HVAC system.

Existing filter products for HVAC systems have several shortcomings, including cost due to the product being designed for specific HVAC systems, and efficiency and energy losses due to the accumulation of contaminants on the products between cleanings and replacements. In particular, filter products require inspection, cleaning or replacement on a regular basis to ensure that the filter product does not become an upstream obstruction that reduces airflow through the condenser unit. As a result, there is considerable resistance to placing any type of airflow restriction upstream of a condenser unit because of the concern for significantly reduced heat transfer efficiency that will result in increased operation and energy consumption by the HVAC system.

BRIEF DESCRIPTION OF THE INVENTION

The present invention provides a contamination barrier and method particularly well suited for use with heat exchanger units, for example, condenser units of types used in HVAC systems.

According to a first aspect of the invention, a contamination barrier includes a filtration media that prevents passage therethrough of relatively coarse contaminants of a size that would be entrapped within the heat exchanger unit but allows passage therethrough of relatively finer contaminants that are sufficiently small to pass entirely through the heat exchanger unit so as to reduce accumulation of contaminants within the heat exchanger unit and reduce the need for cleaning the contamination barrier.

Another aspect of the invention is a method of protecting a heat exchanger unit comprising fins in thermal contact with at least one tube. The method includes securing a contamination barrier upstream of the fins and tube of the heat exchanger unit. The contamination barrier includes a filtration media that prevents passage therethrough of relatively coarse contaminants of a size that would be entrapped within the heat exchanger unit but allows passage therethrough of relatively finer contaminants that are sufficiently small to pass entirely through the heat exchanger unit so as to reduce accumulation of contaminants within the heat exchanger unit and reduce need for cleaning the contamination barrier. The heat exchanger unit is then operated to cause air to be drawn through the fins and tube thereof, wherein the filtration media prevents passage therethrough of the relatively coarse contaminants that would be entrapped within the heat exchanger unit and allows passage therethrough of the relatively finer contaminants that subsequently pass entirely through the heat exchanger unit.

A technical effect of the invention is the ability to maintain the cleanliness of various types and designs of heat exchangers, including but not limited to condenser units used in HVAC systems, thereby improving their efficiency and reducing the operation time and costs, prolonging the service lives of the HVAC systems and their condenser units, and significantly reducing if not eliminating the need for cleaning the condenser units. The contamination barrier achieves such benefits by primarily filtering relatively coarse contaminants that would likely become entrapped within the condenser unit, while allowing the passage of relatively finer contaminants that are sufficiently small to pass entirely through the condenser unit. In this manner, the contamination barrier can also operate for relatively long periods without the need for cleaning and without significantly reducing airflow through the condenser unit. The contamination barrier is also capable of functioning to protect a condenser unit from damage from human contact and the environment.

Other aspects and advantages of this invention will be better appreciated from the following detailed description.

DETAILED DESCRIPTION OF THE INVENTION

Figure 3:
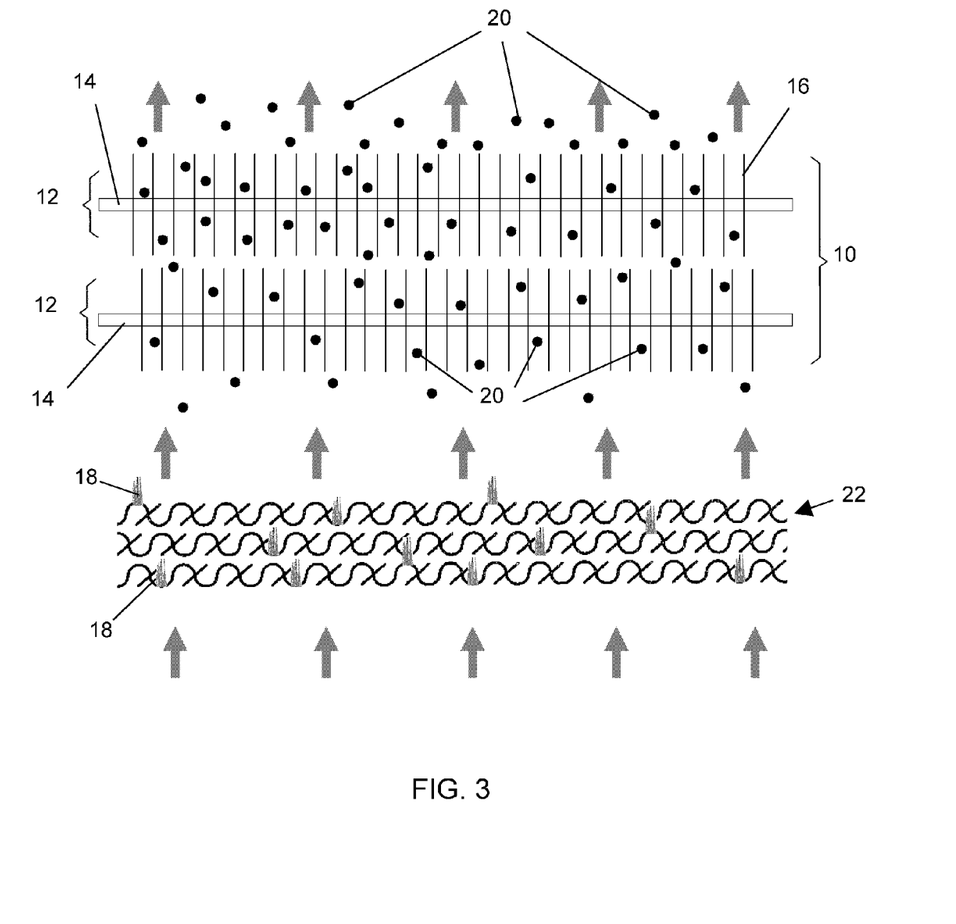
FIG. 3 schematically represents a contamination barrier placed upstream of the condenser assembly of FIGS. 1 and 2, whereby relatively coarse contaminants that are likely to become trapped within and between the tube and fin assemblies are trapped by the contamination barrier and the contamination barrier permits passage of finer contaminants that are capable of passing through the condenser assembly.

FIG. 3 represents a contamination barrier 22 particularly suitable for installation on condenser units of commercial HVAC systems, including condenser units located on the roofs of the buildings. For convenience, the barrier 22 is represented as being installed upstream of the condenser assembly 10 represented in FIGS. 1 and 2. As previously discussed, the condenser assembly 10 is shown as comprising at least two sets of tube and fin assemblies 12, each having at least one heat transfer tube 14 (optionally configured as a coil) contacted by multiple fins 16, though in many applications a single tube and fin assembly 12 may be present in the condenser assembly 10. As a condenser assembly 10, a fluid flows through the tube 16 and heat is transferred from the fluid to the surrounding environment (e.g., atmospheric air) via the fins 16, though in the case of a different type of heat exchanger, heat may be transferred from the surrounding environment to the fluid within the tube 16, and such an operation is also within the scope of the invention. The representation of FIG. 3 is merely for illustrative purposes, and the invention is not limited to condenser units of any particular configuration, and more generally is applicable to a variety of heat exchanger units that comprise one or more tube and fin assemblies 12.

As evident in FIG. 3, the barrier 22 comprises a filtration media that has trapped certain potential contaminants of the condenser assembly 10. In particular, the barrier 22 has trapped relatively coarse debris 18 of a size that would have resulted in the debris 18 becoming entrapped within the condenser assembly 10, for example, between adjacent fins 16 and/or between the two sets of tube and fin assemblies 12. However, the barrier 22 is configured to intentionally allow the passage of relatively finer contaminants, for example, particulate debris 20, whose individual particles are sufficiently small to pass completely through the condenser assembly 10, in other words, between adjacent fins 16 of the condenser assembly 10. For example, the contamination barrier 22 is intended to prevent relatively large contaminants, for example, leaves, paper, fibrous materials, and other relatively large debris often present in an outdoor environment, from reaching the tube and fin assemblies 12, while allowing passage of relatively fine contaminants, for example, dust particles, dirt, etc., that are capable of passing between adjacent fins 16 of the condenser assembly 10. As such, the filtration media is preferably sized so that openings within the media are sized to correspond to the particular spacing between the fins 16. As a nonlimiting example, the openings within the filtration media may be roughly the same size or slightly smaller than the distance between adjacent fins 16.

In contrast, FIG. 1 illustrates the contamination of the condenser assembly 10 resulting from the condenser assembly 10 being unprotected, such that both coarse and fine debris 18 and 20 have become trapped within and between the tube and fin assemblies 12. Even after an intensive cleaning process, FIG. 2 illustrates that further contamination buildup occurs as a result of the remaining coarse debris 18 within the condenser assembly 10 promoting entrapment of the finer debris 20.

The contamination barrier 22 preferably utilizes a filtration media having a lofty, high-weave configuration that, as schematically represented in FIG. 3, enables certain individual coarse debris 18 to wrap itself around an individual fiber at the outer surface or within the interior of the media, thus reducing the surface area of the debris 18 that would present itself as an obstruction to incoming airflow through the barrier 22. In turn, the lofty configuration of the filtration media enables incoming air to flow around an obstruction created by a coarse debris 18, thereby minimizing the total pressure drop through the barrier 22. Furthermore, finer debris 20 (for example, less than about 100 micrometers) is able to freely pass through the barrier 22. Examples of finer debris 20 observed to be capable of passing through the barrier 22 include, but are not limited to, cottonwood seeds, small insects, pollen, dust, etc.

In a particular commercial embodiment of the invention, the filtration media of the barrier 22 is constructed of 100% polyester material with a stiffening agent applied during manufacturing for strength and a UV additive to withstand prolonged sunlight exposure. The media may have a thickness of about one to two centimeters, for example, about one-half inch (about 1.3 cm), which is sufficiently lofty to allow airflow around contamination trapped in its fibers. Significantly thicker filtration media tend to reduce thermal transfer efficiency by increasing the initial pressure drop through the barrier 22, whereas significantly thinner filtration media tend to not enable sufficient airflow around coarse debris 18 trapped within the barrier 22.

Figure 4:
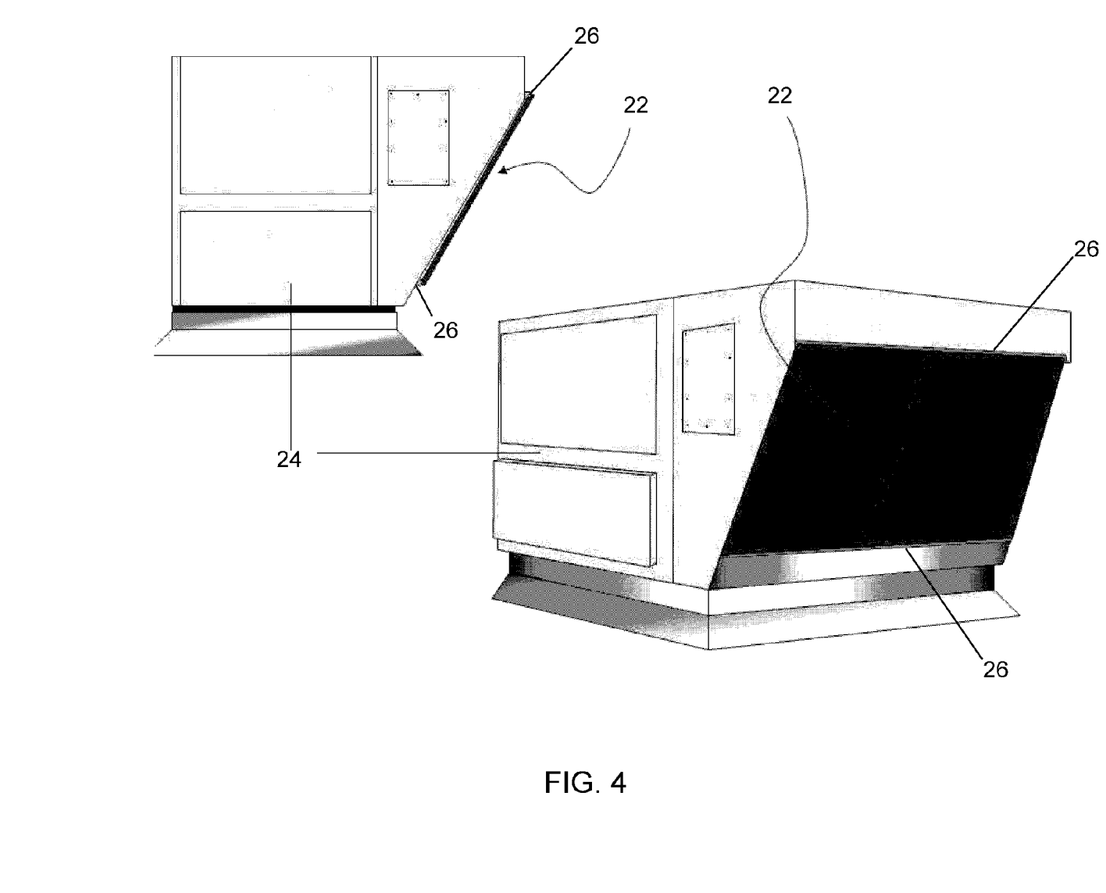
FIG. 4 illustrates an exemplary installation of a contamination barrier on a condenser unit of an HVAC system.

The contamination barrier 22 can be produced in rolls of a mat or sheet material, whose length can be cut according to the dimensions of the heat exchanger unit on which the barrier 22 is to be installed. This allows the contamination barrier 22 to be applied to the vast majority of existing HVAC systems. An example of an installation of the contamination barrier 22 on a roof-mounted condenser unit 24 of a commercial HVAC system is schematically represented in FIG. 4. The contamination barrier 22 is applied across an exposed face of the condenser, such that the one or more tube and fin assemblies (e.g., 12 in FIG. 3) of the condenser unit 24 are concealed by the contamination barrier 22. In this manner, the contamination barrier 22 may also serve to protect the tube and fin assemblies from accidental damage from human or other activities.

Figure 5:
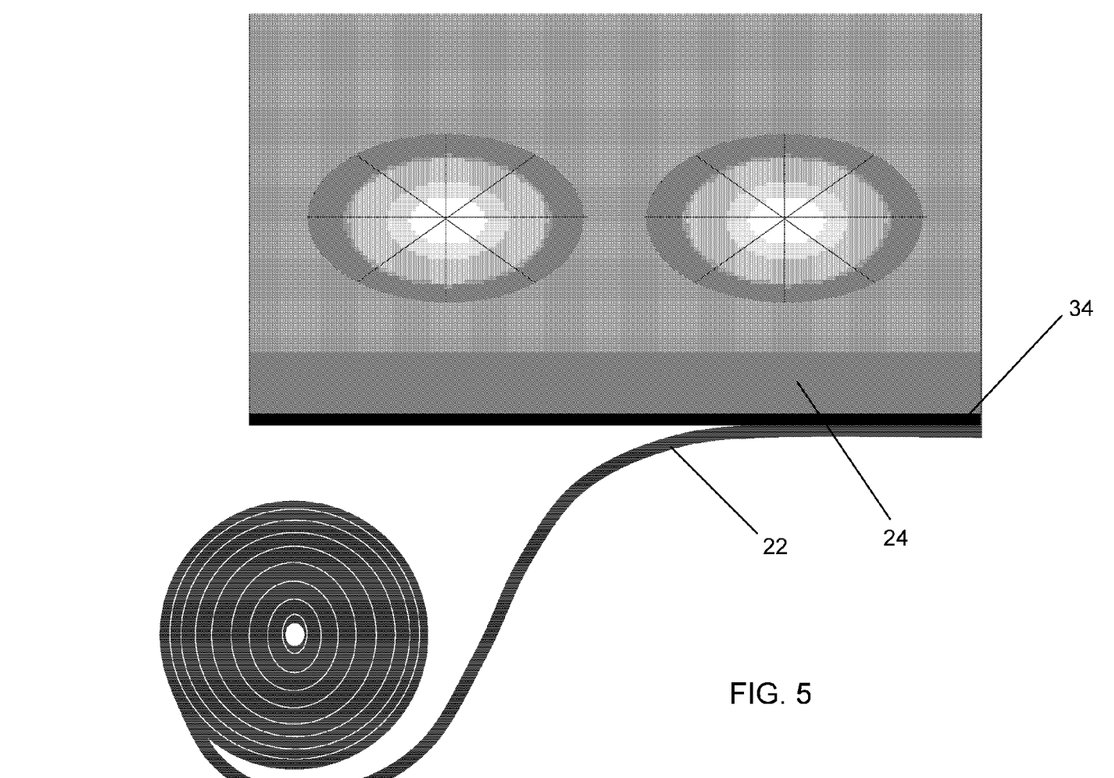
FIG. 5 represents a technique for installing the contamination barrier on the condenser unit of FIGS. 4 and 5.

FIG. 5 is another possible embodiment of the invention, representing a process of installing the contamination barrier 22 on a condenser unit 24. The barrier 22 is in the form of a roll of sheet material having two oppositely-disposed parallel edges that run the as-manufactured length of the barrier 22. The installation length of the barrier 22 can be selectively sized to correspond to a first dimension of the condenser unit 24 (for example, the widths that can be seen in FIGS. 4 and 5) of the condenser unit 24 by cutting transverse to the length of the barrier 22. In preferred embodiments, the width of the barrier 22 (transverse to its length) can be pre-sized to correspond to the dimension of the condenser unit 24 transverse to its first dimension, for example, the particular height of the condenser unit 24 visible in FIG. 4.

Figure 6:
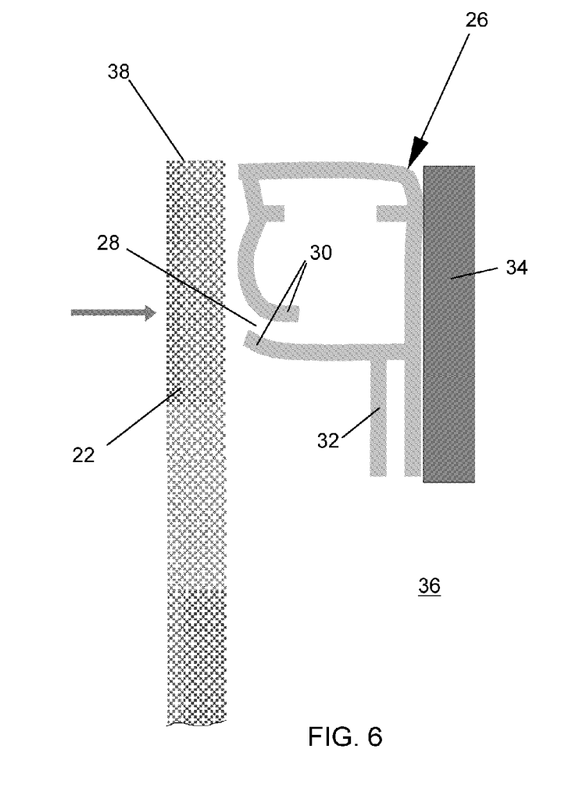
FIG. 6 represents a clip configured for securing an edge of the contamination barrier to the condenser unit of FIGS. 4 and 5.

FIG. 6 illustrates a method by which the contamination barrier 22 may be attached to the condenser units 24 of FIGS. 4 and 5. FIG. 6 is a cross-sectional view showing one of the parallel edges 38 of the contamination barrier 22 and a clip 26 that preferably extends the entire width of an opening 36 of the condenser unit 24 through which the tube and fin assemblies 12 (not shown) are exposed to incoming air. The clip 26 is mounted to a wall 34 of the condenser unit 24 that defines the opening 36 of the condenser unit 24. The clip 26 can be manufactured from various materials, for example, extruded PVC, and can be secured with any suitable fasteners, including mechanical fasteners, adhesives, etc., for example, threaded fasteners (not shown) that pass through a flange 32 of the clip 26 and into the wall 34. The barrier 22 is subsequently secured with the clip 26 by pushing the edge 38 of the barrier 22 through a narrow slot 28 defined by and between two opposing appendages 30 of the clip 26. In preferred embodiments of the invention, the slot 28 is sufficiently narrow to enable the use of a blunt blade (not shown) to push the edge 38 of the barrier 22 through the slot 28 in the direction of the arrow in FIG. 6. The orientation of the example shown in FIG. 6 corresponds to the upper edge 38 of the barrier 22, and a similar operation can be envisioned for the oppositely-disposed lower edge of the barrier 22 as a mirror image of that illustrated in FIG. 6. This simple technique is able to securely hold the contamination barrier 22 in place, while being capable of withstanding a wide variety of environmental extremes.

The contamination barrier 22 can be fabricated from various materials. However, as previously discussed, the filtration media of the contamination barrier 22 must provide filtration of relatively coarse debris 18 while allowing passage of finer particulate debris 20 that is sufficiently small to pass through the condenser assembly 10 and, in particular, between the fins 16 thereof. In doing so, the barrier 22 is preferably capable of achieving several notable benefits. First, the barrier 22 is adapted to promote the efficiency of the condenser assembly 10 be excluding the buildup of debris and other contaminants within the assembly 10. Furthermore, the barrier 22 preferably provides this benefit without significantly reducing airflow through the condenser assembly 10, particularly in comparison to prior art contamination barriers intended to not only prevent coarse debris 18 but also finer and particular debris 20 from entering a condenser unit. As a result of the barrier 22 not intentionally entrapping finer particulate debris 20, buildup of contamination on the barrier 22 itself is reduced, thereby extending the service life of the barrier 22. In certain environments, the contamination barrier 22 is self-cleaning, in other words, wind and rain effectively remove coarse debris 18 from the out surface of the barrier 22, with the result that the barrier 22 requires little or no regular maintenance. Because of the potential for an extended service life, the contamination barrier 22 can be economically constructed of disposable materials and disposed of at the end of its useful life.

As a result of promoting the cleanliness of the condenser assembly 10, the overall efficiency of an HVAC system can be maintained, thereby reducing energy consumption over the life span of the system. In some instances, energy consumption has been reduced between 12.5% and 30% as compared to unprotected HVAC systems.

As also previously noted, the barrier 22 also has the potential for protecting the tube and fin assemblies 22 of a condenser unit 24 from environmental or human contact. For this purpose, the filtration media preferably has sufficient strength and durability to remain secured by the clips 26 (or other suitable securing means) while withstanding adverse environmental and operating conditions.

While the invention has been described in terms of specific embodiments, it is apparent that other forms could be adopted by one skilled in the art. For example, the contamination barrier 22 and the heat exchanger unit 24 on which it is installed could differ from those shown, and various materials and processes could be used to construct and install the contamination barrier 22. Therefore, the scope of the invention is to be limited only by the following claims.

The invention claimed is:

1. A contamination barrier for protecting a heat exchanger unit comprising fins that are in thermal contact with at least one tube and are spaced so that there is a distance between adjacent pairs of the fins, the contamination barrier comprising:
   a filtration media having a lofty high-weave configuration that forms wave patterns that differ in direction from air flowing through the heat exchanger unit and forms openings with sizes that correspond to the distance between the adjacent pairs of the fins of the heat exchanger unit to prevent passage therethrough of coarse contaminants of a size that would be entrapped within the heat exchanger unit but allow passage therethrough of finer contaminants that are sufficiently small to pass entirely through the heat exchanger unit so as to transfer accumulation of the coarse contaminants from within the heat exchanger unit to the filtration media;
   wherein the lofty high-weave configuration causes the air flowing through the filtration media to flow around and behind obstructions created by the coarse contaminants accumulated in the filtration media to thereby minimize total pressure drop through the barrier and reduce the need for cleaning the contamination barrier.

2. The contamination barrier according to claim 1, wherein the contamination barrier is a sheet having oppositely-disposed parallel edges along a length thereof, the contamination barrier comprises means for securing the parallel edges of the contamination barrier to the heat exchanger unit upstream of the fins and tube, the securing means comprises at least two clips, and each of the clips is a strip adapted to secure one of the parallel edges of the contamination barrier by inserting each of the parallel edges into a slot defined by and between opposing appendages of a corresponding one of the clips.

3. The contamination barrier according to claim 1, wherein the filtration media comprises a polyester material having a stiffening agent that increases the strength of the filtration media.

4. The contamination barrier according to claim 1, wherein the filtration media comprises a UV additive that enables the filtration media to withstand prolonged sunlight exposure.

5. The contamination barrier according to claim 2, wherein the contamination barrier is adapted to be sized in a lengthwise direction by being cut transversely to the parallel edges.

6. The contamination barrier according to claim 1, wherein the lofty high-weave configuration enables an individual coarse contaminant to wrap around an individual fiber of the filtration media to reduce a surface area of the individual coarse contaminant that obstructs air flowing through the contamination barrier and to enable the air drawn flowing through the filtration media to flow around an obstruction created by the individual coarse contaminant.

7. The contamination barrier according to claim 1, wherein the contamination barrier is installed on the heat exchanger unit so that the filtration media is located upstream of the fins and tube and prevents passage of the coarse contaminants to the heat exchanger unit.

8. The contamination barrier according to claim 7, wherein the heat exchanger unit is a condenser of a heating, ventilation, and air conditioning (HVAC) system.

9. The contamination barrier according to claim 1, wherein the filtration media has openings with sizes up to the distance between the adjacent pairs of the fins of the heat exchanger unit.

10. The contamination barrier according to claim 8, wherein the condenser unit is installed on a roof of a building, on the ground adjacent a building, or inside a building.

11. A contamination barrier installed on a condenser unit of a heating, ventilation, and air conditioning (HVAC) system, the condenser unit comprising fins that are in thermal contact with at least one tube and are spaced so that there is a distance between adjacent pairs of the fins, the contamination barrier comprising:
    a sheet comprising a filtration media and having oppositely-disposed parallel edges along a length thereof, the filtration media having a lofty high-weave configuration that forms wave patterns that differ in direction from air flowing through the condenser unit and forms openings with sizes that correspond to the distance between the adjacent pairs of the fins of the condenser unit to prevent passage therethrough of coarse contaminants of a size that would be entrapped within the condenser unit but allow passage therethrough of finer contaminants that are sufficiently small to pass entirely through the condenser unit so as to transfer accumulation of the coarse contaminants from within the condenser unit to the filtration media;
    wherein the lofty high-weave configuration causes the air flowing through the filtration media to flow around and behind obstructions created by the coarse contaminants accumulated in the filtration media to thereby minimize total pressure drop through the barrier and reduce the need for cleaning the contamination barrier, the filtration media comprising a polyester material having a stiffening agent that increases the strength of the filtration media; and
    a fastener system that secures the parallel edges of the contamination barrier to the condenser unit so that the filtration media is located upstream of the fins and tube thereof so as to prevent passage therethrough of the coarse contaminants to the condenser unit.

12. The contamination barrier according to claim 11, wherein the filtration media comprises a UV additive that enables the filtration media to withstand prolonged sunlight exposure.

13. The contamination barrier according to claim 11, wherein the fins of the condenser unit are spaced so that there is a distance between adjacent pairs of the fins, the filtration media comprising openings with sizes that correspond to the distance between the adjacent pairs of the fins.

14. The contamination barrier according to claim 13, wherein the openings comprise sizes up to the distance between the adjacent pairs of the fins.

15. The contamination barrier according to claim 11, wherein the condenser unit is installed on a roof of a building, on the ground adjacent a building, or inside a building.

16. A method of protecting a heat exchanger unit comprising fins that are in thermal contact with at least one tube and are spaced so that there is a distance between adjacent pairs of the fins, the method comprising:
    securing a contamination barrier upstream of the fins and tube of the heat exchanger unit, the contamination barrier comprising filtration media comprising a lofty high-weave configuration that forms wave patterns that differ in direction from air flowing through the heat exchanger unit and forms openings with sizes up to the distance between the adjacent pairs of the fins of the heat exchanger unit to prevent passage therethrough of coarse contaminants of a size that would be entrapped within the heat exchanger unit but allow passage therethrough of finer contaminants that are sufficiently small to pass entirely through the heat exchanger unit so as to transfer accumulation of the coarse contaminants from within the heat exchanger unit to the filtration media and reduce the need for cleaning the contamination barrier; and
    operating the heat exchanger unit to cause air to be drawn through the filtration media of the contamination barrier and then through the fins and tube of the heat exchanger unit, wherein the filtration media prevents passage therethrough of the coarse contaminants that would be entrapped within the heat exchanger unit and allows passage therethrough of the finer contaminants that subsequently pass entirely through the heat exchanger unit, and the lofty high-weave configuration causes the air flowing through the filtration media to flow around and behind obstructions created by the coarse contaminants accumulated in the filtration media to thereby minimize total pressure drop through the barrier.

17. The method according to claim 16, further comprising:
    providing the contamination barrier as a sheet having oppositely-disposed parallel edges along a length thereof; and
    sizing the contamination barrier in a lengthwise direction thereof by cutting the sheet transversely to the parallel edges.

18. The method according to claim 16, wherein the securing step comprises attaching at least two clips to the heat exchanger unit wherein each of the clips is a strip, and securing the parallel edges of the contamination barrier to the clips by inserting each of the parallel edges into a slot defined by and between opposing appendages of a corresponding one of the clips.

19. The method according to claim 16, wherein during the operating step an individual coarse contaminant wraps around an individual fiber of the filtration media to reduce a surface area of the individual coarse contaminant that obstructs the air flowing through the contamination barrier and to enable the air drawn through the filtration media to flow around an obstruction created by the individual coarse contaminant.

20. The method according to claim 16, wherein the heat exchanger unit is a condenser unit of a heating, ventilation, and air conditioning (HVAC) system.

21. The method according to claim 16, further comprising producing the filtration media of a polyester material having a stiffening agent that increases the strength of the filtration media and a UV additive enables the filtration media to withstand prolonged sunlight exposure.

* * * * *